Oct. 7, 1958   W. A. MORGAN   2,855,533
PRESSURE MEASURING DEVICE
Filed April 29, 1954

Inventor:
Walter A. Morgan,
by Charles W Helzer
His Attorney.

United States Patent Office 2,855,533
Patented Oct. 7, 1958

2,855,533
PRESSURE MEASURING DEVICE

Walter A. Morgan, Latham, N. Y., assignor to General Electric Company, a corporation of New York Application April 29, 1954, Serial No. 426,339

4 Claims. (Cl. 313—161)

This invention relates to pressure measuring devices, and more particularly to an improved device for measuring the pressure of a gas from the current intensity resulting from ionization taking place in the gas.

It is well known that the current intensity resulting from ionization in a relatively rarefied gas is a function of the pressure of the gas. It is also known that the sensitivity of a pressure measuring device constructed in accordance with this principle may be increased by subjecting the electrons that are responsible for maintaining the ionization to a magnetic field in order to increase the probability of the electrons striking the discrete molecules of the gas. A pressure measuring device of this general type is described in U. S. Patent No. 2,197,079, issued April 16, 1940, to F. M. Penning.

An object of the present invention is to provide an improved pressure measuring device that includes a novel ionization gage, which has greater sensitivity than present day gages of the same general type.

Another object of the invention is to provide in an improved measuring device an ionization gage having a unitary, simplified structure that permits the gage to be conveniently mounted in a system.

The foregoing and other objects are achieved in accordance with the invention by the provision of a pressure measuring device that embodies an ionization gage comprising a housing provided with an opening for the passage of the gas whose pressure is to be measured, and a magnet for establishing a magnetic field therein. A pair of electron-emissive cathodes are spaced apart within the housing and connected by the magnetic field, and an anode is located between the cathodes. The cathodes preferably comprise electron-emissive surfaces formed on the poles of the magnet itself and the entire magnet may be included within the housing if desired, thus simplifying the gage structure. Because the poles of the magnet are located with in the housing rather than outside it, as in presently known gages of this general type, the air gap of the magnet in which the cathodes and anode are located is small, and the strength of the magnetic field existing between the cathodes and the anode may be made greater than has heretofore been possible without the use of an inconveniently large magnet. Thus, when a suitable potential is applied between the cathodes and the anode, the length of time taken for electrons to travel from the electron-emissive cathodes to the anode may be increased. This results in increased probability of ionization of the gas, increased current flow, and improved gage sensitivity.

In the preferred arrangement wherein the cathodes comprise electron-emissive surfaces formed on the poles of the magnet itself, the cathode structure is greatly simplified over presently known gages of this type that require the provision of separately mounted cathodes. In addition, the air gap of the magnet may be further reduced in width with attendant increases in magnetic field strength and gage sensitivity. A still further reduction in air gap width may be accomplished by utilizing a magnetic material for the electron-emissive cathodes formed on the magnet poles.

Further objects and advantages of the invention will become apparent from the following description, taken in conjunction with the accompanying drawing, in which Fig. 1 is a plan view of one embodiment of the gage of the invention with parts broken away to show internal structure clearly;

Figure 1:
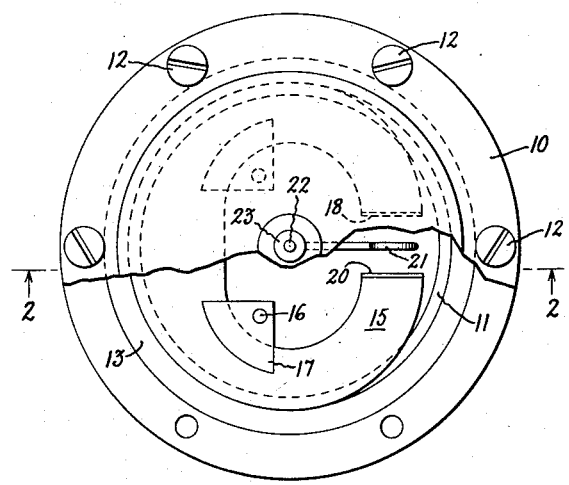
Figure 2:
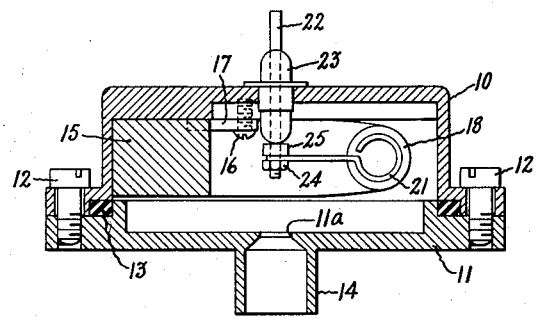
Fig. 2 is a sectional view taken on the line 2—2 of Fig. 1.

Referring now to Figs. 1 and 2, the form of the ionization gage of the invention there shown includes a housing that comprises a cup-shaped upper portion 10 and a base 11. The housing may be made of stainless steel or other suitable non-magnetic material. The upper portion 10 and the base 11 may be secured together by screws 12 that are threaded into the base through a flange on the upper portion 10, and a vacuum tight seal is maintained between the two portions of the housing by a suitable rubber or synthetic rubber O ring 13 interposed between the upper portion 10 and the base 11. An opening 11a is provided in the base 11 for the passage of gas into the interior of the housing, and a suitable fitting 14 may be provided around the opening to permit the gage to be conveniently attached to the system in which the gas pressure is to be measured.

In the embodiment shown, a permanent horseshoe magnet 15 having opposed poles is closely contained within the housing, and is secured to the top of the upper portion 10 by screws 16 that extend through lugs 17 welded or otherwise attached to the magnet. Of course, an electromagnet may be substituted for the permanent magnet, and, if desired, the majority of the magnet may be located outside the housing with only the poles extending through the housing into its interior. A pair of cathodes are spaced apart within the housing and connected by the magnetic field therein, and, in the particular form of ionization gage illustrated, the cathodes comprise a non-thermionic, electron-emissive metal layer formed on the poles of the magnet 15 to provide the magnet with opposed electron-emissive surfaces 18 and 20.

It is known that metallic atoms have loosely bound electrons which can readily pass from atom to atom in a solid mass, and experience no force in any particular direction. One of these electrons could pass through the surface of the metal, and, while it is still close to the surface, induce a positive charge thereon. This induced charge exerts a force known as image force that tends to return the electron to the metal. In order to escape entirely from the metal, the electron must, by virtue of its velocity component normal to the surface, possess enough kinetic energy to carry it beyond the range of the image force. This amount of kinetic energy is known as the electron affinity or work function. Therefore, the metal from which the electron-emissive layers on the magnet poles are formed should be selected with due regard to the work function of the particular metal, so that electrons may be emitted from the opposed surfaces 18 and 20 without requiring the use of an abnormally high voltage gradient. Various metals are suitable for this use, and it has been found that soft iron or nickel performs well in this application. In addition, an advantage is gained in keeping the air gap of the magnet as small as possible by constructing the electron-emissive layers of a magnetic electron-emissive metal such as soft iron.

It is pointed out that the term "pole" is taken to include "pole piece" and invention is not limited to the construction wherein electron-emissive surfaces are formed directly on the poles of the magnet, but also includes the arrangement where the emissive surfaces are formed on pole pieces of the magnet. In that case, of course, only the opposed electron-emissive tips of the pole pieces need be inside the vacuum-tight housing and the remainder of the magnet may be outside the housing if desired.

An anode 21 is located between the electron-emissive poles, and in the present case is of frame-like configuration having dimensions slightly less than the dimensions of the opposed electron-emissive surfaces 18 and 20. The plane of the anode is substantially perpendicular to the magnetic field existing between the poles, so that the majority of the lines of flux comprising the magnetic field pass through or around the frame-like anode. However, a portion of the magnetic field near the periphery thereof is intersected by the anode. The anode is constructed of a conducting material such as stainless steel or nickel, and is formed with an extension 21a by means of which the anode is electrically connected to and supported from a center conductor 22. The center conductor 22 extends through the upper portion 10 of the housing and is separated therefrom by an insulator 23. The anode extension 21a is secured to the bottom of the conductor 22 between a nut 24 and a spacer 25 that is inserted between the insulator and the nut to position the anode properly with respect to the poles of the magnet.

Figure 3:
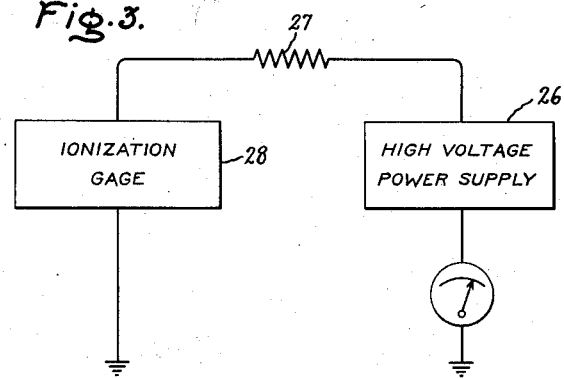
Fig. 3 is a circuit diagram of the pressure measuring device of the invention.

A pressure measuring device constructed in accordance with the teachings of the invention is shown diagrammatically in Fig. 3. A positive potential is supplied by a D. C. high voltage supply 26 through a load resistor 27 to the anode of the ionization gage described above, which is designated by the numeral 28. The magnet 15, the electron-emissive surfaces 18 and 20, and the housing, all of which are electrically connected, may be grounded, and a microammeter 30 may be connected between the negative terminal of the high voltage supply 26 and ground. Thus, current flowing through the ionization gage 28 will also flow through the meter 30.

In operation, a positive D. C. potential of several thousand volts is applied to the anode 21 by the high voltage supply 26, and thus a large potential gradient is established near the opposed electron-emissive surfaces 18 and 20 of the poles of the magnet. Because of the potential gradient, electrons are omitted from these surfaces and are accelerated toward the anode. However, the magnetic field existing between the poles prevents the electrons emitted from the surfaces 18 and 20 (cathodes) from travelling directly along the electric lines of force to the anode, and compels the electrons to travel in the direction of the magnetic lines of force or to perform a helical movement around them. Therefore, electrons may pass through or around the frame-like anode 21, and, upon arriving near the opposite poles, they may be repelled therefrom. Consequently, the electrons may vibrate back and forth between the poles until they are finally deviated to the anode under the influence of the electric field. During the travel of the electrons, they collide with gas molecules and ionize the molecules, and the electrons released from the ionized molecules also move toward the anode and in turn ionize other gas molecules in a chain reaction. The number of electrons reaching the anode per unit time is a function of the number of gas molecules per unit volume (i. e., the pressure of the gas) within the system. Because the poles of the magnet are located within rather than outside the housing and the cathodes comprise electron-emissive surfaces on the magnet poles the air gap of the magnet may be made smaller and the magnetic field strength may be greater. A stronger magnetic field causes the electrons emitted from the cathodes to travel a greater distance before they reach the anode, increase the probability of the electrons ionizing the gas, and increases the intensity of the current flow resulting from the ionization. Thus, the current flowing through the microammeter 30 is increased and the pressure measuring device has increased sensitivity. The scale of the microammeter may be calibrated to read pressure directly, or suitable curves may be provided to convert from current to pressure values.

It has been found that the device of the invention is capable of measuring pressure as low as $1 \times 10^{-6}$ millimeters of mercury, and, in addition, the device is capable of measuring much lower pressures if an amplifier is inserted in the circuit to amplify the current resulting from the ionization. The highest pressure that the device is capable of measuring accurately has been found to be approximately $30 \times 10^{-3}$ millimeters of mercury.

The following table lists illustrative, approximate values or dimensions for the various elements comprising a typical pressure measuring device constructed in accordance with the invention:

| | | |
|---|---|---|
| Diameter of surfaces 18 and 20 | inches | ½ |
| Diameter of anode 21 | do | ½ |
| Air gap between surfaces 18 and 20 | do | 7/16 |
| Flux density of magnetic field | gauss | 1200 |
| Resistor 27 | megohms | 1 |
| Potential on anode 21 | volts | 2000 |

Overall dimensions of gage:
| | | |
|---|---|---|
| Diameter | inches | 2½ |
| Height | do | 1¾ |

It has now become apparent that the pressure measuring device provided by the invention fulfills the objectives set forth above. The sensitivity of the device has been greatly improved by providing a novel ionization gage, wherein the magnet may have a much smaller air gap than is possible in other gages of the same general type. Simultaneously, the construction of the gage has been greatly simplified, by providing cathodes formed on the magnet itself to eliminate complicated cathode structures. In addition, the difficulty encountered in mounting the gage, which is common to those devices wherein the magnet is located completely outside of the vacuum tight housing, is eliminated. The present device may be conveniently and easily mounted in any system.

It is apparent that many changes and modifications may be made by one skilled in the art without departing from the spirit of the invention, and it is intended to be limited only by the scope of the appended claims.

What I claim as new and desire to secure by Letters Patent of the United States is:

1. In a device for measuring the pressure of a gas from the current intensity due to ionization taking place in the gas, an ionization gage comprising a housing provided with an opening for the passage of the gas, a magnet having a pair of poles, said poles being contained within said housing, an electron-emissive surface on each said pole, and a frame-like anode located between said electron-emissive surfaces and intersecting a portion of the magnetic field existing between said poles.

2. In a device for measuring the pressure of gas from the current intensity due to ionization taking place in the gas, an ionization gage comprising a housing provided with an opening for the passage of the gas, a magnet having a pair of poles, an electron-emissive surface on each said pole, said electron-emissive surfaces being opposed and contained within said housing, and a frame-like anode located between said opposed surfaces and intersecting a portion of the magnetic field existing between said poles with the plane of said anode being substantially perpendicular to the lines of flux of said magnetic field.

3. In a device for measuring the pressure of a gas from the current intensity due to ionization taking place in the gas, an ionization gage comprising a housing provided with an opening for the passage of the gas, a magnet contained within said housing and having a pair of poles, an electron-emissive surface on each said pole, and a frame-like anode located between said electron-emissive surfaces and intersecting a portion of the magnetic field existing between said poles.

4. In a device for measuring the pressure of a gas from the current intensity due to ionization taking place in the gas, an ionization gauge comprising a housing provided with an opening for the passage of the gas, a magnet having a pair of poles, said poles being contained within said housing, an electron emissive surface on each of said poles, said electron emissive surfaces being formed from a magnetic material, and a frame-like anode located between said electron emissive surfaces and intersecting a portion of the magnetic field existing between said poles.

References Cited in the file of this patent

UNITED STATES PATENTS

| | | |
|---|---|---|
| 2,197,079 | Penning | Apr. 16, 1940 |
| 2,490,468 | Picard | Dec. 6, 1949 |
| 2,502,236 | Smith | Mar. 28, 1950 |
| 2,506,431 | Perret et al. | May 2, 1950 |